June 30, 1953    G. G. HAVENS    2,643,700
METHOD AND APPARATUS FOR MANUFACTURING CYLINDRICAL BODIES
Filed Nov. 22, 1951
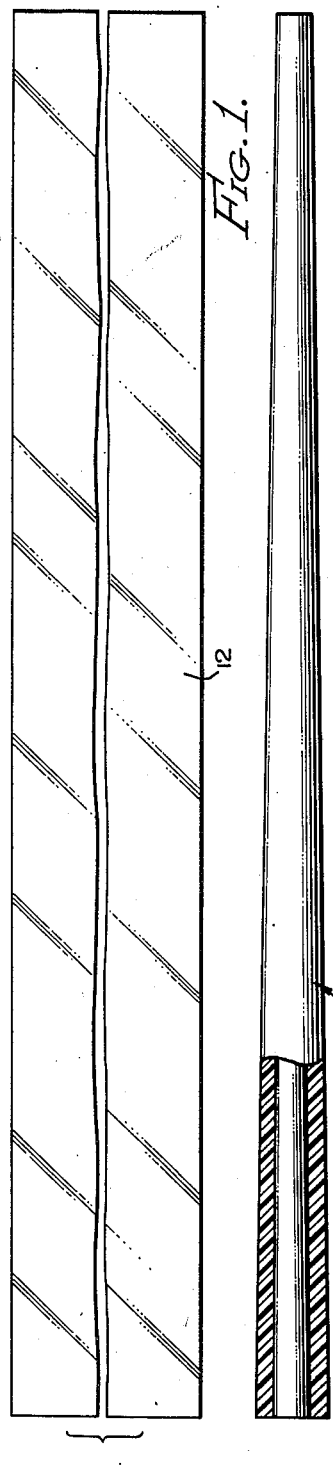
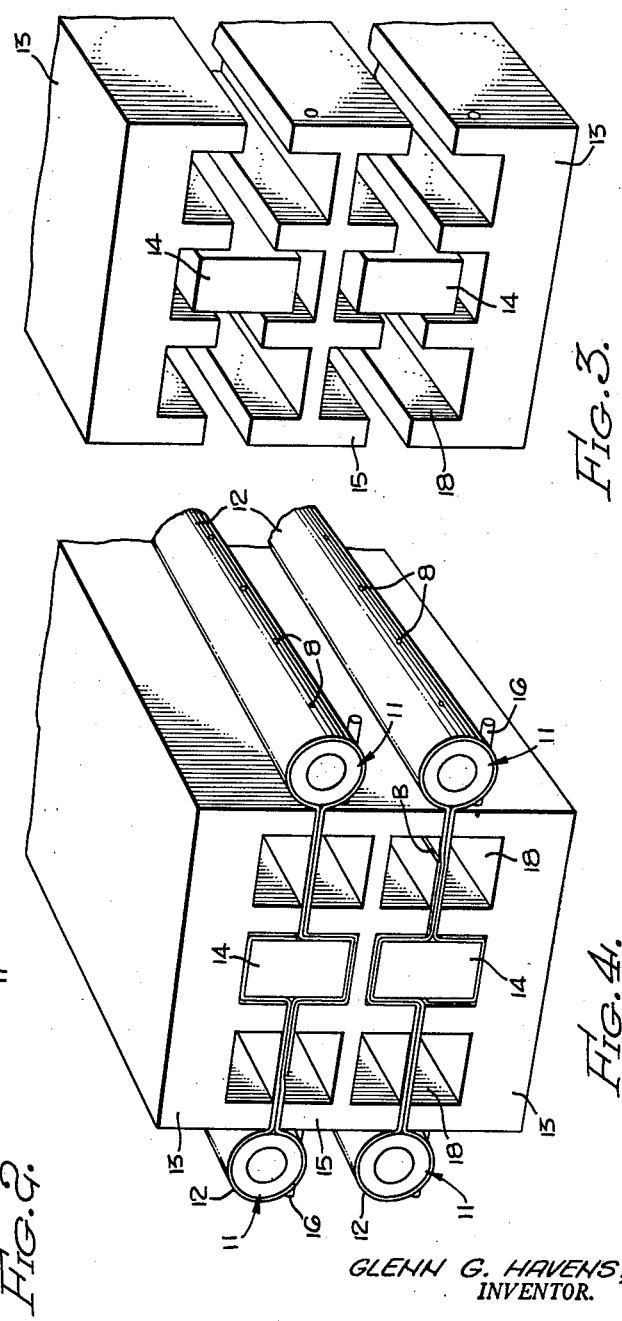
GLENN G. HAVENS,
INVENTOR.
BY
*Lyon & Lyon*
ATTORNEYS

UNITED STATES PATENT OFFICE 2,643,700

METHOD AND APPARATUS FOR MANUFACTURING CYLINDRICAL BODIES

Glenn G. Havens, San Diego, Calif., assignor to Narmco, Inc., San Diego, Calif., a corporation of California Application October 22, 1951, Serial No. 252,527

14 Claims. (Cl. 154—1)

This invention relates to an improved method and apparatus for manufacturing rods, tubes, cylinders or other solid or hollow bodies composed of convolutely wound layers of fibrous material reinforced with a resinous binder.

In the manufacture of such items as fishing poles and the like, high strength materials are now frequently employed which consist of a material, such as a glass fibre cloth which has been impregnated with a binding compound, for example a synthetic thermosetting resin. To construct such items it is customary to wrap the impregnated material about a suitable mandrel and then subject the wrapped mandrel to a relatively high temperature to set or cure the binding compound. Following this operation, the mandrel may be removed if a hollow body is desired.

In addition to heating the wrapped mandrel, it is customary to subject the same to pressure during the curing operation in order to insure that the resin compound completely fill the interstices in the cloth and securely bond the contiguous surfaces of the cloth layers. The present invention relates to an improved method and apparatus for applying this desired pressure to the wrapped mandrel during the curing operation.

The conventional technique for applying this pressure, and one which is currently used commercially, is to employ a thin strip of cellophane material which is spirally wrapped about the outside of the wrapped mandrel. For this purpose PT-600 cellophane, a commercially available product of E. I. du Pont de Nemours & Co., is frequently used. This material has the desired properties of a smooth uniform surface, initial flexibility, will contract on heating, has a uniform thickness, and can be plasticized by water to facilitate its removal after cure.

In such spiral wrap process a narrow, continuous, overlapping strip of cellophane binding tape is wound around a mandrel upon which the resin-impregnated glass cloth has been shaped, winding from one end of the mandrel and working toward the other end, the tape overlapping about one-half its width for successive winds. After securing the free end of the tape, the wrapped mandrel is placed in an oven, or subjected to heat in some manner, and cured. Thereafter, the tape is customarily removed. It has been found that this spiral wrap process possesses several disadvantages. Thus, there is formed a ridged, staircase-like surface along the rod due to the pressure exerted by the overlapping cellophane binding tape, the tape creating such pressure by the inherent shrinking characteristic of cellophane when heated. This effect must be removed to produce an attractive and salable item. Its removal is normally accomplished manually by sandpaper, which entails a high labor and time expenditure. In addition, the continuous glass fibre cloth laminate is interrupted by the sanding producing areas of low strength. In addition, due to the extreme difficulty of maintaining a uniform amount of overlap and tension while winding the tape on the mandrel, the finished rod possesses the varying physical strengths produced during the cure by the uneven pressures which the tape exerts. Further, the wrapping of the tape itself takes a great deal of time, thereby adding to the expense of the manufacturing process.

In accordance with the present invention, a novel method and apparatus is employed whereby each of these difficulties is eliminated. Thus, in place of a continuous strip of spirally wound cellophane, a single sheath of binding material, preferably the PT-600 cellophane already described, is employed. This sheath is wound about the wrapped mandrel but a single time, the two free ends thereof being secured by the clamping action of a novel type curing fixture. The sheath is preferably treated to stretch slightly on wrapping, thus giving higher unit pressures on shrinking due to its initial stretched condition. Instead of many ridges which must be sanded, only a single longitudinally extending "flash line" results, which is located at the juncture of the two free edges. This "flash line" can be quickly removed by sanding without the deleterious results above described when the conventional spiral wrap technique is employed. Furthermore, the use of the single binding sheath promotes uniform strength characteristics throughout the rod because of the absence of extensive sanding, and by virtue of the substantially uniform pressure created by the one-piece binding sheath wrap. Moreover, the improved process utilizing the novel curing fixture avoids the difficulties of binding tape overlap and tension already mentioned, in addition to cutting the excessive costs and time necessary in the existing spiral wrap technique.

Accordingly, it is an object of the present invention to provide an improved process for curing rods, tubes or the like, formed of convolutely wound layers of cloth impregnated with a binding agent.

It is a further object of the invention to provide an improved clamping fixture for use in such process.

Other objects and advantages of the invention will become apparent by reference to the detailed description hereinafter given and to the drawings in which like numerals are employed to designate like parts throughout the same.

In the drawings:

Fig. 1 is a plan view of a strip of cut binding sheath.

Fig. 2 is a plan view of a mandrel wrapped with resin-impregnated material.

Fig. 3 is a fragmentary perspective view of a clamping curing fixture embodying the present invention.

Fig. 4 is a fragmentary perspective view of the curing fixture, wrapped mandrel and binding sheath, assembled and ready for cure.

In the drawings, wherein for the purpose of illustration is shown a preferred embodiment of the invention, the numeral 11 designates a wrapped mandrel, formed by wrapping glass, fabric or similar material which has been impregnated with a suitable thermosetting resin, about a mandrel. The mandrel may be tapered, as shown, or of uniform diameter, if desired, and serves to form either a permanent core or a hollow interior section in the finished rod. In the latter case, the mandrel is removed after curing, as will be described hereinafter. While various types of material may be used, that which has been found preferable is a glass fabric in which the yarns of the fabric extend principally in a longitudinal direction relative to the mandrel. The fabric is square woven with the weft yarns substantially less in strength than the warp yarns. A specific example of a preferred fabric, but not by way of limitation, is a glass fabric having a thickness of 0.009 inch and an area of 1.8 square yards per pound. Such a fabric includes warp cords of 225–3/2 construction spaced about 25 ends per inch, and weft or fill cords of 450–1/2 construction spaced about 28 ends per inch. This fabric is known in the market today as "Fiberglas," and is a commercially available product of the Owens-Corning Fiberglas Corporation.

The preferred resinous materials used to coat and impregnate the glass fabric and for bonding the fabric to form an integral composite rod of high strength-to-weight ratio are the thermosetting "plastics," for example phenol formaldehyde or partially polymerized phenol formaldehyde. Such materials are generally available and well known in the art, as are methods of coating and impregnation of the fabric. For this reason, detailed description thereof is deemed unnecessary.

The mandrel is preferably made of metal, but wood or other materials well known in the art may be used. If a hollow rod is desired, the mandrel may be first coated or treated with a suitable parting agent before wrapping the fabric about it in order to facilitate later removal of the mandrel. Various parting agents, such as silicone greases or waxes, are well known in the art, and need not, therefore, be described herein in detail.

After application of the parting agent, and after wrapping the mandrel with the fabric, the wrapped mandrel must be cured under the proper combination of temperature and pressure to polymerize the resin. Holding the wrapped mandrel at a temperature of approximately 300° F. for approximately thirty minutes has been found to be most suitable, although somewhat lower temperatures for a longer period or higher temperatures for a shorter period are almost equally satisfactory. Of course, the curing cycle will vary with the type of resin used, the data here being applicable to a phenol formaldehyde type resin. The cure is obtained by any of the conventional curing methods, that is, ovens, radiant heating lamps, catalysts, di-electric heating units, or others.

To create the necessary pressure according to the present invention, a continuous sheet of cellophane or similar material is unrolled from a supply roll and preferably guided by rollers into a dip tank, which contains a solution of a suitable parting agent, which may be the same as that applied to the mandrel. The parting agent, in conjunction with the cellophane, facilitates the separation of the cellophane from the impregnated fabric after curing. In addition, the parting agent solution plasticizes the cellophane, rendering it possible to stretch the cellophane slightly on wrapping, thus aiding in the development of higher unit pressures upon shrinking of the cellophane during the cure. The excess solution is removed from the cellophane as it emerges from the dip tank by squeegees or similar devices, after which the cellophane sheet 12 is cut off in lengths approximately equal to the length of the rod to be cured. This sheet is placed lengthwise adjacent to an outer section 13 of the curing fixture, and a bar or key 14 is forced into the slot of such section, locking the cellophane sheet. The excess sheet width is then trimmed off. The wrapped mandrel 11 is then placed lengthwise on that part of the cellophane sheet extending outside the outer section 13, and the sheet is wound around the wrapped mandrel and back across the outer section to the other side thereof, where another wrapped mandrel is enclosed by the cellophane as before described. The sheet of cellophane is brought back over the outer section again, the sheet being approximately wide enough to terminate at B, Fig. 4. Next, the inner section 15 is placed over it, the mating sections thus securely locking the cellophane sheet in position. Small pegs 16 may be secured in the curing fixture sections to support the weight of the rods to be cured, if desired. If additional wrapped mandrels are to be cured, this operation is repeated with the other outer section 13, except that the second outer section is inverted and placed on the already assembled inner and outer sections. In order to preserve the pressure generated during the curing operation, it is preferable that the curing fixture sections be held tightly together. This can be readily accomplished by positioning weights along the upper outer section of the fixture by employing C clamps distributed along the length of the fixture, or other suitable means.

If desired, very small perforations may then be made in the cellophane skin to allow for the escape of gases during the cure, preferably along the outer length of mandrel as indicated at 8, although this operation is unnecessary when resins are utilized which give off little or no gases upon curing. In addition, it has been found advantageous to form the sections with outboard slots 18, as shown, to form channels for such escaping gases, although such degassing slots may be omitted, if desired.

In the preferred embodiment of the present invention, four rods or tubes are cured simultaneously. As is readily apparent, however, one or two rods can be cured by omitting the inner section 15 and one of the bars 14, and assembling the other bar 14 and the two outer sections 13; curing six or eight or more at a time is also possible by substituting one or more inner sections in the position of the second outer section 13 and then capping the assembly with the outer section 13. In addition, if desired, wrapped mandrels may be positioned length to length by utilizing longer sections.

If the mandrel core is to be removed, it can be readily pulled or knocked out after curing. The cellophane may be soaked off by dipping the cured rod in water for a short time, ease of removal being facilitated by the presence of the parting agent on the cellophane, and also by the plasticizing action of the water on the cellophane. As an alternative, other methods of removal, well known in the art, including a steam blast against the cellophane, may be used to strip off the cellophane. Of course, if the intended use of the rod or tube permits, the cellophane may be left on. The flash line on the rod, located where the cellophane did not completely enclose the wrapped mandrel, may be readily sanded down to give the completed object a smooth and finished appearance.

It is to be understood that the form of the invention herewith shown and described is to be taken as a preferred example of the same and that various changes in shape, size and arrangement of parts may be resorted to without departing from the spirit of the invention or the scope of the subjoined claims.

I claim:

1. A process for forming cylindrical bodies comprising wrapping a resin-impregnated material about a mandrel, positioning a sheet of binding material on a section having a keyway therein, clamping said sheet in said section with a mating key, drawing said sheet around the wrapped mandrel and over the said mating key, clamping said mandrel and said sheet by positioning over said mating key a second section having a keyway adapted to receive said key, maintaining said sections tightly together, and heating the wrapped mandrel to cure the resin-impregnated material.

2. A process in accordance with claim 1 and including the step of applying a parting agent to the said mandrel.

3. A process for forming cylindrical bodies comprising wrapping a resin-impregnated material about a mandrel, positioning a sheet of binding material on a fixture section having a keyway therein, clamping said sheet in said section with a mating key, drawing said sheet about said wrapped mandrel and over said fixture section, drawing said sheet about a second and similar wrapped mandrel and over said mating key, clamping said mandrels and said sheet by positioning over said mating key a second section having a keyway adapted to receive said key, maintaining said sections tightly together, and heating the wrapped mandrels to cure the resin-impregnated material.

4. A process in accordance with claim 3 and including the step of applying a parting agent to each of the said mandrels.

5. A process for forming cylindrical bodies comprising wrapping a resin-impregnated material about a mandrel, positioning a sheet of binding material on a fixture section having a keyway therein, clamping said sheet in said section with a mating key, drawing said sheet about said wrapped mandrel and over said fixture section, drawing said sheet about a second and similar wrapped mandrel and over said mating key, positioning a second sheet of binding material on a second fixture section having a keyway therein, clamping said second sheet in said second section with a second mating key, drawing said second sheet about a third wrapped mandrel and over said second fixture section, drawing said second sheet about a fourth and similar wrapped mandrel and over said second mating key, inverting said second section with respect to said first section, clamping the first and second mentioned wrapped mandrels to the first mentioned section and the third and fourth mentioned wrapped mandrels to the second mentioned section by positioning between said sections a third section having keyways adapted to receive each of said keys, maintaining said sections tightly together, and heating the wrapped mandrel to cure the resin-impregnated materials.

6. A process in accordance with claim 5 and including the step of applying a parting agent to each of the said mandrels.

7. A curing fixture comprising one section having a longitudinal channel therein, a second section having a longitudinal channel therein, and a binding bar adapted to fit within said channels to bind said sections together.

8. A curing fixture in accordance with claim 7 and wherein each of said sections has longitudinal gas outlet channels disposed therein.

9. A curing fixture comprising an outer section having a longitudinal channel therein, a second outer section having a longitudinal channel therein, an inner section having longitudinal channels on either side thereof, a binding bar adapted to fit within the channel of one of the said outer sections and one of the channels of the inner section to bind said sections together and a second binding bar adapted to fit within the channel of the other outer section and the other channel of the inner section to bind said sections together.

10. A curing fixture in accordance with claim 9 and wherein each of said sections has longitudinal gas outlet channels disposed therein.

11. In a device of the class described for curing a resin-impregnated material while enclosed by a binding sheath the combination of a curing fixture comprising one section having a longitudinal keyway therein; a mandrel about which said impregnated material is wrapped; said binding sheath enclosing said mandrel and a binding bar adapted to fit within said keyway to bind said sections, sheath and mandrel together.

12. A curing fixture in accordance with claim 11 wherein each of said sections has longitudinal gas outlet channels disposed therein.

13. In a device described for curing a resin-impregnated material while enclosed by a binding sheath, the combination of a curing fixture comprising an outer section having a longitudinal channel therein; a second outer section having a longitudinal channel therein; an inner section having longitudinal channels on either side thereof; a pair of mandrels each of which is wrapped with said resin-impregnated material; binding sheaths enclosing each of said mandrels; a binding bar adapted to fit within the channel of one of said outer sections and one of the channels of the inner section; a second binding bar adapted to fit within the channel of the other outer section and the other channel of the inner section; said binding bar acting to bind said sections, sheaths and mandrels together.

14. A curing fixture in accordance with claim 13 wherein each of said sections has longitudinal gas outlet channels disposed therein.

GLENN G. HAVENS.

References Cited in the file of this patent

UNITED STATES PATENTS

| Number | Name | Date |
|---|---|---|
| 2,517,698 | Muskat | Aug. 8, 1950 |